July 13, 1965
H. J. PARSONS ETAL
3,194,081
SELECTIVE SPEED CHANGER FOR VARIABLE SPEED DRIVE
Filed Nov. 17, 1961
4 Sheets-Sheet 1
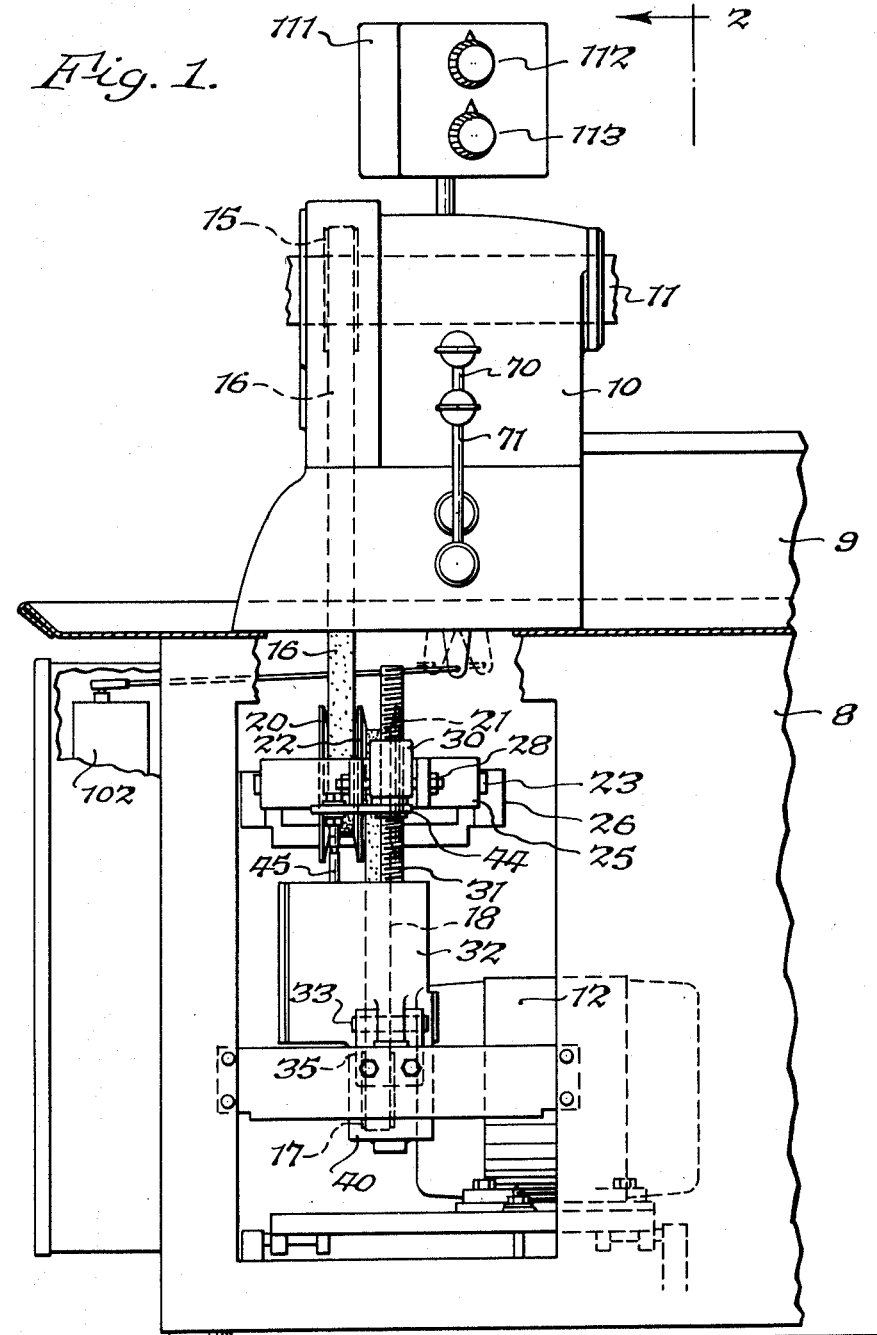
INVENTORS
ATTORNEYS.

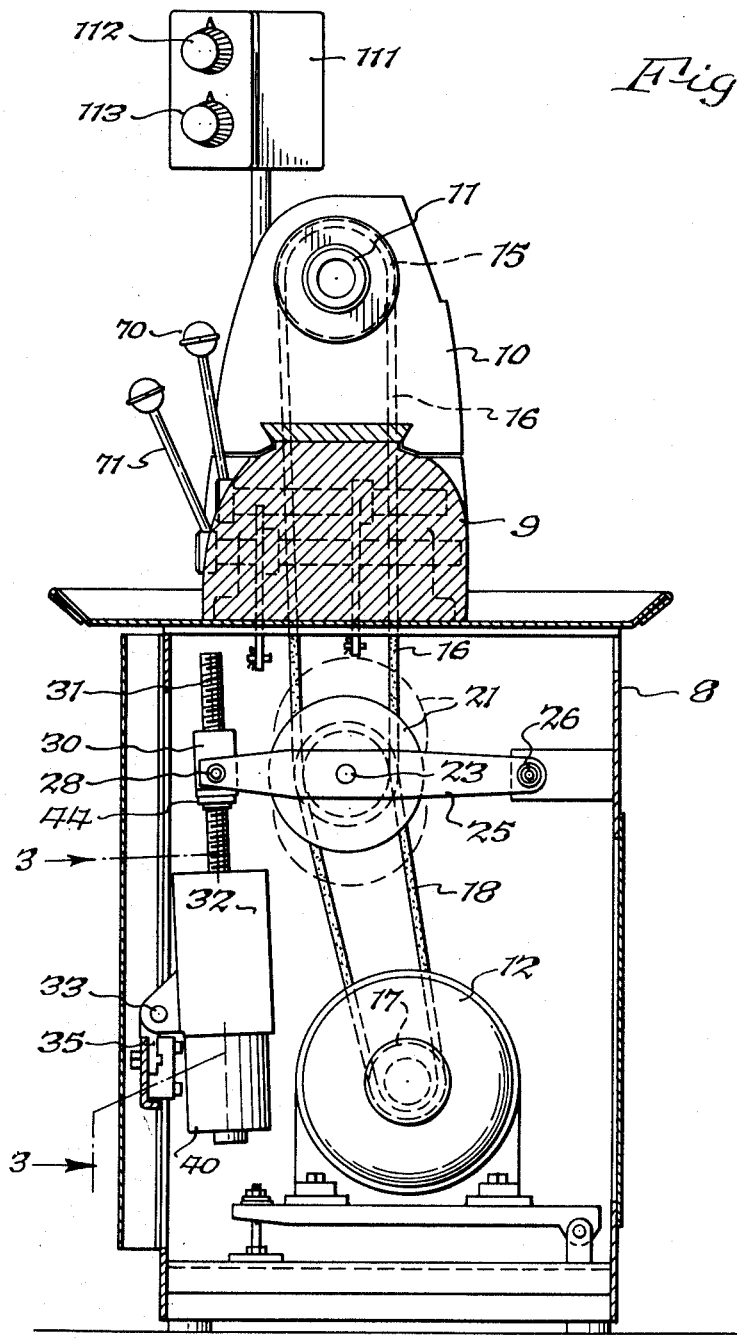

July 13, 1965  H. J. PARSONS ETAL  3,194,081
SELECTIVE SPEED CHANGER FOR VARIABLE SPEED DRIVE
Filed Nov. 17, 1961  4 Sheets-Sheet 3
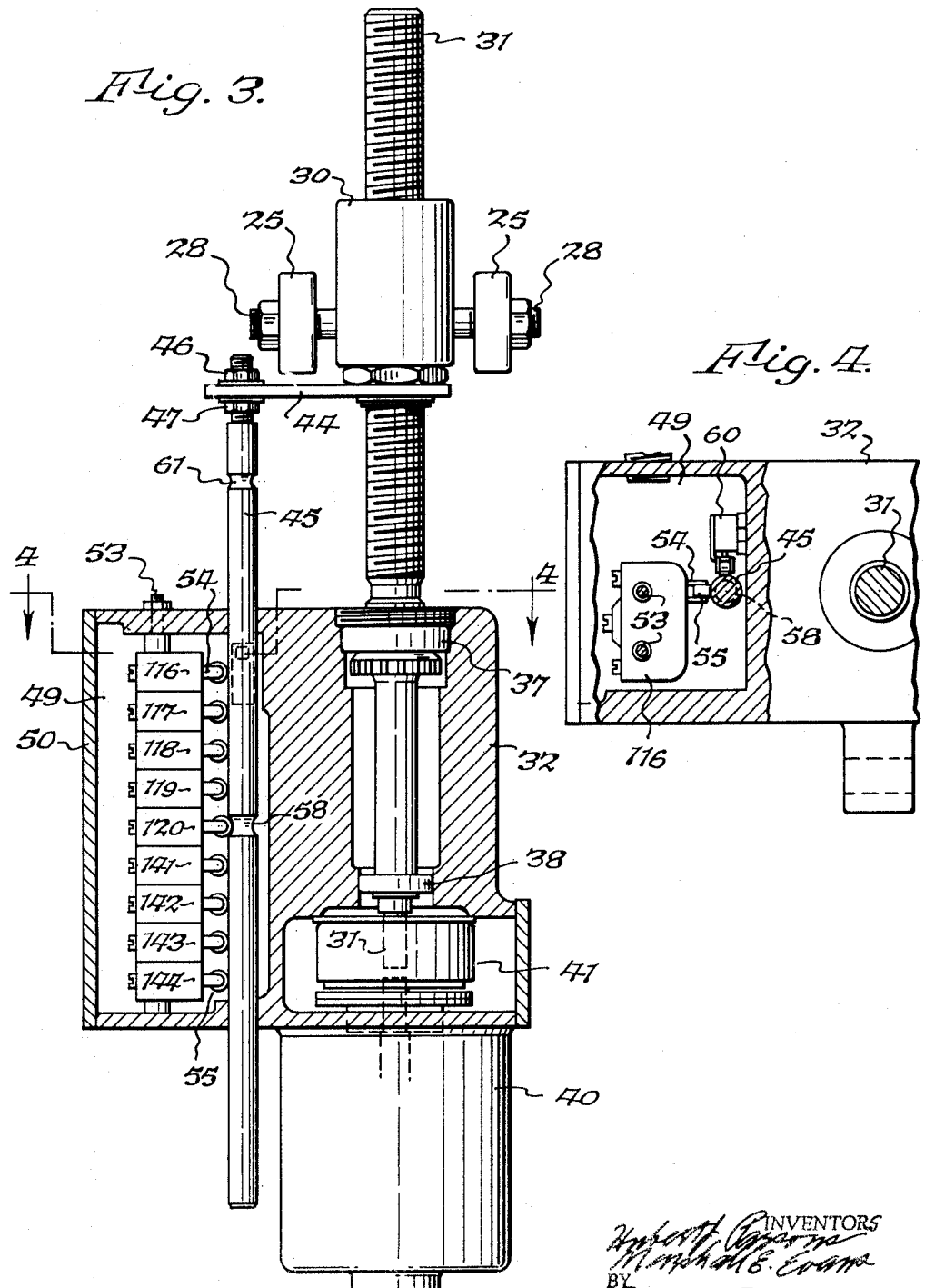

United States Patent Office 3,194,081
Patented July 13, 1965

3,194,081
SELECTIVE SPEED CHANGER FOR VARIABLE SPEED DRIVE
Hubert J. Parsons, Horseheads, N.Y., and Marshall E. Evans, Millerton, Pa., assignors to Hardinge Brothers, Inc., Elmira, N.Y.
Filed Nov. 17, 1961, Ser. No. 153,038
5 Claims. (Cl. 74—230.17)

This invention relates to improvements in position controllers such as may for example be used in connection with variable speed V-belt drives of the general type disclosed in Evans Patent No. 2,695,529 of Nov. 30, 1954.

One of the objects of this invention is to provide an improved position controller which can be used to provide a preselective speed change mechanism adapted for use in connection with V-belt drives of the types shown in said patent, which is easily operated and in which the parts to be actuated to preselect the speeds are positioned in convenient relation to an operator.

A further object is to provide mechanism of this type by means of which a large number of speeds may be obtained.

Another object is to provide a mechanism in which the change of speed is effected by an electric motor having an electric brake mounted on it for quick stopping.

It is also an object of this invention to provide a position controller which can be readily actuated by an operator and which automatically sets the controller in a predetermined position without requiring the attention of the operator to adjust the mechanism to the position desired.

In the accompanying drawings:

FIG. 1 is a front elevation of a machine, partly broken away, and showing a speed control mechanism having a position controller embodying this invention applied thereto.

FIG. 2 is a sectional elevation thereon on line 2—2, FIG. 1.

FIG. 3 is a sectional elevation thereof on an enlarged scale on line 3—3, FIG. 2.

FIG. 4 is a fragmentary, transverse view thereof on line 4—4, FIG. 3.

Figure 5:
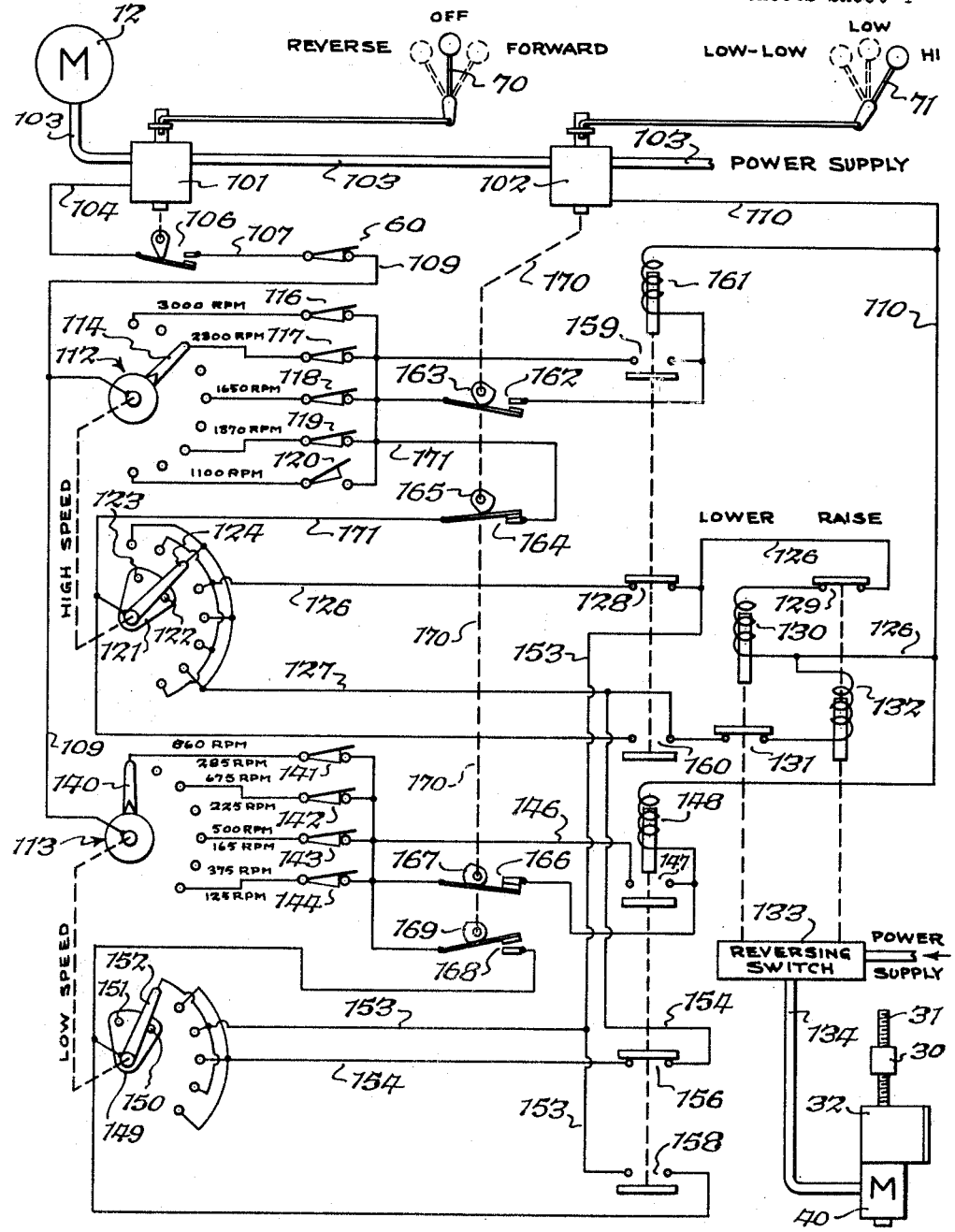
FIG. 5 is a circuit diagram of the electrical system by means of which the variable speed mechanism is operated.

My improved speed control mechanism is shown in the accompanying drawings as applied to a lathe but it will be understood that this speed control mechanism may be employed for driving any desired machine or apparatus. The lathe shown by way of example in the drawings includes a pedestal 8 on which one end of the bed 9 of the lathe is supported, and 10 represents the headstock of the lathe having the usual spindle 11. This spindle is driven through V-belts by a motor 12, which in the construction illustrated is a two speed electric motor. Within the headstock and secured on the spindle is provided the usual driven pulley 15 driven by a V-belt 16. The motor shown has a pulley 17 mounted thereon which cooperates with a V-belt 18. The V-belt 16 and 18 operate in connection with an intermediate pulley assembly which includes two fixed, outer, belt-engaging pulley members 20 and 21 rigidly mounted on a shaft 23, and a movable pulley member 22 slidably mounted for movement lengthwise of the shaft 23 on which the pulley members 20 and 21 are secured. The movable pulley member is arranged between the two fixed pulley members 20 and 21. The intermediate pulley assembly is mounted on a carrier 25 hinged at one end at 26 on a fixed bracket secured to the machine and having the shaft 23 slidably journalled thereon intermediate of its ends. The other end of the carrier is pivoted at 28 on a nut 30 which cooperates with an adjusting screw shaft 31 constituting a part of our improved position controller. By rotating the screw 31 relatively to the nut 30, the intermediate pulley assembly carrier is swung toward or from the driven pulley 15 for the purpose of varying the speed of the latter. This speed change mechanism is well known and a further detailed description of the same is believed not to be necessary.

The adjusting screw shaft 31 is journalled in a housing 32 which is pivoted at 33 on a bracket 35. The axis of the pivot 33 is substantially parallel to the hinge mounting 26 so that the adjusting screw housing 32 may swing to compensate for the arc through which the nut passes during the adjustment of the carrier 25. The adjusting screw 31 is held against movement lengthwise relatively to the housing 32 by means of suitable bearings 37 and 38, FIG. 3.

The screw shaft 31 may be turned in either direction by means of an electric motor mounted in a housing 40 secured to the housing 32, and an electrically operated friction brake 41 of any usual or suitable construction is mounted in the lower portion of the housing 32 and on the lower end of the screw shaft 31. The brake is provided for stopping the rotation of the adjusting screw 31 immediately upon interruption of the electric current to the motor. Since brakes of this kind are available on the open market, further description of the same is not believed necessary, and it will be understood that this brake opposes rotation of the screw whenever the supply of current to the motor 40 is interrupted, and when the current is again supplied to the motor the brake is immediately released.

It is desirable to provide the speed change mechanism with a part which moves in proportion to the movement of the carrier 25 and for that purpose, in the construction shown, the nut 30 has secured thereto an outwardly extending arm 44 to the outer end of which the control rod 45 is secured. The upper end of the control rod may be provided with screw threads with which nuts 46 and 47 cooperate, these nuts being arranged above and below the arm 44 so that the control rod may be adjusted as desired relatively to the arm 44. The control rod projects through openings formed in the upper and lower walls of an extension of the housing 32 and passes through a chamber or space 49 in this extension, this space being closed by means of a plate 50 which may be removed for rendering the interior of the housing extension accessible.

Within the chamber 49 of the extension of the housing 32 are arranged a series of electric speed or stop switches mounted in the housing by means of a pair of rods 53 extending through the upper and lower walls of the housing extension and through parts of these switches to hold the same one above the other in fixed relation to the housing. These switches, which have the reference characters 116–120 inclusive and 141–144 inclusive, are spring actuated to urge them into open circuit positions. The switches however are provided with arms 54 having rollers 55 mounted thereon which extend in a position to engage the control rod 45 against which the rollers are yieldingly pressed while the switches are in closed circuit positions. The control rod is provided with an actuating portion, such for example, as an annular groove or notch 58 with which one of the rollers 55 of the switches may enter or otherwise engage, and when thus engaged, the switch of which the roller is in the groove will then be in open circuit position. For example, in the construction shown in FIG. 3, all of the speed or stop switches are held in closed circuit position by contact with the control rod 45 with the exception of switch 120, the roller of which is in the groove 58 of the control rod and thus in open position, breaking the circuit which had been completed through this switch. However, as the control rod 45 moves up or down, other switches will be moved into open circuit positions by having their rollers enter the groove 58, but since the circuits in which these switches are included are not completed, nothing will happen. If, however, circuits are completed by a switch, such for example as the switch 120 power will be supplied to the motor 40, but will be instantly interrupted when the roller of this switch enters the groove 58 of the control rod, thus setting the apparatus for the speed indicated by the position of the control rod 45 and the screw shaft 31.

A similar switch 60 mounted on the housing has a roller positioned to enter into the groove 58 or into another groove 61 on the control rod 45. This switch 60 is normally in closed circuit position but acts as a safety or limit switch. Consequently, when the control rod 45 is moved downwardly so that the roller of the safety switch enters the groove 61 of the control rod, the switch will be moved into open circuit position so that no further downward movement of the control rod is possible. Similarly, when the control rod moves upwardly so that the groove 58 is in position to permit the roller of the safety switch 60 to enter into the same, then the switch 60 will be moved into open circuit position to prevent further upward movement of the control rod and of the screw shaft 31.

*Electrical operating means*

The electrical means for operating the mechanism which has been described may be of any suitable kind, those shown by way of example are as follows:

Drive motor 12 is controlled by an OFF, FORWARD and REVERSE switch 101 actuated by lever 70, and another HIGH, LOW, LOW-LOW switch 102 is actuated by a lever 71, power being supplied through power supply conduits 103 which contain the necessary wiring to connect the above mentioned units properly.

The aforementioned control levers 70 and 71 operate these switches 101 and 102 into their desired control positions. Power is also supplied to the electrical circuit through the line 104 which is connected to a cam operated switch 106, which is open when the lever 70 is in OFF position, but closed when the lever is in either FORWARD or REVERSE positions. Line 107 connects switch 106 to the safety limit switch 60 which opens the circuit at the extreme travel in either direction of the pulley shift control rod 45, FIG. 3, to prevent over travel. From this switch the line 109 continues to supply current to the control circuit now to be explained and to the other side of line 110.

On the headstock of the machine or other readily accessible position, a switch box 111 is located which has a knob-controlled high speed tap switch 112 and a knob-controlled low speed tap switch 113. Each of these switches is comprised of two sets of switch taps controlled from the same knob. Switch 112 has in its first set a contactor 114 to make connection with five contacts connected to high speed switches 116, 117, 118, 119 and 120 representing the high speed range. The knob and shaft of the switch 112 are fixed to the contactor 114, but in the second set of its switches they are connected to a lost motion lever 121 having a pair of pins 122 and 123 which move a contactor 124. The contactor 124 makes connection with four taps connected with a line 126 and alternately with four taps connected with a line 127. The line 126 then goes to the other side of the line 110 having in series with it a pair of contacts 128, 129 and a LOWER relay 130; the line 127 going to the other side of the line 110 has in series with it a pair of contacts 131, a RAISE relay 132 and line 126. As mentioned before, the taps of lines 126 and 127 are alternately contacted by the contactor 124 as it is positioned or rotated one way or another so as to energize either the LOWER relay 130 or the RAISE relay 132, which actuates a reversing switch 133 connected to power and by line 134 to the motor 40 which shifts the intermediate pulley assembly.

The low speed tap switch 113 is almost identical to the high speed tap switch 112 just described, the line 109 connecting with the contactor 140 through the taps connected to the low speed switches 141, 142, 143 and 144, the line 146 contacts 147 and the relay 148 to the other side of the line 110. This low speed switch 113 also has connected to its shaft a lost motion lever 149 having pins 150 and 151 which engage the contactor 152 which engages alternately three taps connected to the line 153 and three taps connected to the line 154.

The line 153 connects to contacts 129 by its connection to line 126 the LOWER relay 130 to the other side of line 110 while the line 154 goes to contacts 156, line 127, contacts 131, RAISE relay 132, line 126 to the other side of the line 110.

As just described, these connections make possible the pre-selection of a high or a low speed by turning the knobs of either the switches 112 or 113 to a high or low speed with the lost motion part of each switch correctly sensing whether the reversing switch 133 should move the pulley up or down to get to the speed selected, through energizing the proper RAISE or LOWER relay 130 or 132. When the proper speed position is reached, the speed switch selected will be opened by the position of the control rod 45 and the circuit will become de-energized through the opening of that particular speed switch whose roller has fallen into the groove 58, leaving the machine in that speed until another is selected.

Relay 148 and a relay 161 serve to make sure through their switches in the circuit that proper raising or lowering of control rod 45 will take place when using either the high speed selector switch 112 or the low speed selector 113.

To provide a LOW-LOW speed, the low speed tap switch 113 is used and the speed control lever 71 is moved to LOW-LOW position. Through its shaft 170 four switches 162, 164, 166 and 168 in the circuit are operated by their cams 163, 165, 167 and 169 to move them into proper open and closed positions. With the lever 71 in this position the main drive motor 12 is now operating at low speed, thus giving lower speeds than when lever is in the LOW position where the motor 12 would be driven at its high speed.

The switch 162 opens when the lever 71 is in its HIGH position, while switch 164 closes in the HIGH position. In the LOW and LOW-LOW positions, switch 162 is closed while switch 164 is open.

Switch 166 will open when the lever 71 is in LOW-LOW or LOW position, while the switch 168 will close in these positions. In the HIGH position, switch 166 will be closed and switch 168 will be open, as shown in FIG. 5.

*Operation*

As will be noted in FIGS. 3 and 5, the switch 120 is in open position because its roller is in the annular groove 58 of the control rod 45. The machine is not running because the lever 70 is in the OFF position. Let us assume a speed of 2300 r.p.m. is now wanted. The lever 71 will be placed in HIGH position, the switch 112 is moved to the 2300 r.p.m. indication or position, and we are ready to start the machine, as will be seen in FIG. 5. As soon as lever 70 is placed in either forward or reverse position, current will flow through the now-closed switch 106, line 107, switch 60, line 109, switch 112, contactor 114, speed switch 117, closed switch 164, line 171, contactor 124, line 127, contacts 131 through RAISE relay 132 energizing it, line 126 to the other side of the line 110, completing the circuit. The RAISE, LOWER motor 40 is now raising the control rod 45 to bring the groove 58 up to the switch 117, whereupon it opens, the circuit is broken and the electric clutch brake 41 of the motor 40 instantly stops in that position.

It should be noted here that the lost motion lever 121 used its pin 122 to move the contactor 124 to a tap contact connected with the line 127. This energized the RAISE relay 132 to actuate the switch 133 raising the control rod 45. If the switch 112 had been in the 3000 r.p.m. position, to be moved clockwise down to the 2300 r.p.m. position, the pin 123 would have moved the contactor 124 to the first tap contact connected with the line 126. This would have energized the LOWER relay 130 to actuate the switch 133 to activate the motor 40 to lower the control rod 45 rather than to raise it as just before explained.

The low speed selector switch 113 operates in a similar manner as that just described while the relays 148 and 161 and their respective contacts 159, 160, 147 and 158 guard against the motor 40 going in the wrong direction to raise instead of lower the control rod 45 or vice versa.

The speeds indicated in FIG. 5 are merely to facilitate understanding of the construction. It will of course be understood that these speeds may be varied as desired.

It will be understood that various changes in the details, materials and arrangements of parts which have been herein described and illustrated in order to explain the nature of the invention may be made by those skilled in the art within the principle and scope of the invention as expressed in the appended claims.

We claim:

1. A position controller including a housing, a screw shaft rotatable in said housing, a nut movable by said screw shaft, a control member also movable in said housing and connected with said nut to move in unison therewith and having an actuating portion, an electric motor for turning said screw shaft, a plurality of switches arranged in said housing and each having a part for engagement with said control member for biasing said switches into closed positions, manually controlled means for placing any one of said switches into an electric circuit including said motor, the switch so connected in the electric circuit being movable by the actuating portion of said control member into an open circuit position to interrupt further movement of said motor and nut, said electric circuit in which said manually controlled means is in the form of a speed tap switch, raise and lower switches mechanically connected to said speed tap switch, said speed tap switch being manually set to the speed desired, a lost motion switch actuating either said raise or lower switches to raise or lower said nut according to the setting of said speed tap switch, said circuit also including a raise relay and a lower relay to operate said motor in the desired direction, and a control switch therefor connected in said circuit to activate said circuit when said main drive motor is energized.

2. In a variable speed V-belt transmission of the type including driving and driven pulleys and an intermediate pulley assembly connected by belts with said driving and driven pulleys and adjustable toward and from the same to vary the speed of the driven pulley, that improvement which includes actuating means for moving said pulley assembly into the desired position for obtaining the desired speed of said driven pulley, a control member connected with and movable with said pulley assembly and comprising a rod movable in unison with said pulley assembly and having an actuating portion thereon, a plurality of speed switches arranged along the path of movement of said rod and each having a part formed to be moved by said actuating portion into a circuit-interrupting position, manually adjustable means for connecting one of said speed switches corresponding to the speed desired in a circuit, said circuit also controlling movement of said actuating means and being interrupted when said connected speed switch is moved into open circuit position by said actuating portion, to stop further movement of said actuating means, said actuating means being an electric motor receiving electric current through a speed switch, a screw shaft rotated by said motor and connected with said pulley assembly for raising and lowering the same and with said control member, said motor and screw shaft being stopped when the speed switch connected in circuit with said motor is moved into open circuit position by said actuating portion of said rod.

3. In a variable speed V-belt transmission of the type including driving and driven pulleys and an intermediate pulley assembly connected by belts with said driving and driven pulleys and which may be raised and lowered to vary the speed of said driven pulley, that improvement for positioning said pulley assembly which includes a
    master switch having high, low and low-low positions,
    high and low speed tap switches each having lost motion connections with companion high and low speed tap switches,
    connections between said master switch and a pair of cam actuated switches controlling up and down motion in connection with said tap switches,
    an electric positioning motor for raising and lowering said intermediate pulley assembly,
    a reversing switch connected with said motor and operated by a lowering relay and a raising relay,
    electrical circuitry connecting with a power source, said master switch, said high and low speed tap switches, said cam actuated switches and said relays to cause said master switch and said high and low tap switches to bring said pulley assembly into positions for which said master switch and said tap switches are set.

4. A variable speed mechanism comprising a drive motor,
    a variable positionable belt and pulley arrangement connected with said motor,
    a master switch for controlling said mechanism and having high, low and low-low positions,
    a high speed tap switch and a low speed tap switch, each of said high and low speed tap switches having a lost motion connection to companion high and low speed tap switches,
    a mechanical connection between said master switch and a pair of up and down switches for each of the high and low speed tap switches,
    a lower relay and a raise relay operating a reversing switch,
    a pulley-positioning motor receiving power through said reversing switch,
    electrical circuitry connecting said master switch, said high and low speed tap switches, said cam actuated up and down switches, said lower and raise relays with a power source, so that said variable speed mechanism will follow the positions of the master switch and the high, low tap switches to bring said variable speed mechanism into position to deliver the speed indicated by said master switch, said high and low tap switches and said cam actuated switches.

5. A variable speed transmission according to claim 4 and including:
    relay means actuated by said circuitry to assume proper direction of said positioning motor when said master switch is moved from high, low and low-low positions.

References Cited by the Examiner

UNITED STATES PATENTS

| | | | |
|---|---|---|---|
| 2,167,850 | 8/39 | Phillips | 318—33 |
| 2,422,448 | 6/47 | Trible | 318—33 |
| 2,436,068 | 2/48 | Hegy | 318—33 |
| 2,557,849 | 6/51 | Victory. | |
| 2,748,665 | 6/56 | Senn | 74—424.8 XR |
| 2,941,638 | 6/60 | Hoover | 74—424.8 XR |

DON A. WAITE, *Primary Examiner.*